(12) United States Patent
Sakamoto

(10) Patent No.: US 6,876,382 B1
(45) Date of Patent: Apr. 5, 2005

(54) SYSTEM FOR AND METHOD OF PRINTING IMAGE ACCORDING TO CONTROLLED STATE OF USER MONITOR

(75) Inventor: Koichi Sakamoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/139,330

(22) Filed: Aug. 25, 1998

(30) Foreign Application Priority Data

Aug. 29, 1997 (JP) ............................................. 9-233415

(51) Int. Cl.⁷ ............................................. H04N 5/225
(52) U.S. Cl. ............................... 348/207.2; 348/207.99
(58) Field of Search ............................. 348/207.2, 552, 348/207.99, 187, 188, 223, 1; 358/1.15, 296, 1.9, 518, 521, 527, 523, 520, 452; 709/217, 218, 219; 347/2; 345/629, 634; 382/254; 396/2

(56) References Cited

U.S. PATENT DOCUMENTS

| | | | | |
|---|---|---|---|---|
| 4,658,286 A | * | 4/1987 | Schwartz et al. | ........... 348/179 |
| 4,751,583 A | * | 6/1988 | Levine | ....................... 358/452 |
| 5,351,201 A | * | 9/1994 | Harshbarger et al. | .. 348/207.99 |
| 5,696,850 A | * | 12/1997 | Parulski et al. | .............. 358/1.9 |
| 5,754,227 A | * | 5/1998 | Fukuoka | ..................... 348/552 |
| 5,768,633 A | * | 6/1998 | Allen et al. | ..................... 396/2 |
| 5,862,217 A | * | 1/1999 | Steinberg et al. | ........... 348/552 |
| 6,011,547 A | * | 1/2000 | Shiota et al. | ............... 382/254 |
| 6,249,835 B1 | * | 6/2001 | Isoda | ....................... 358/1.15 |
| 6,330,068 B1 | * | 12/2001 | Matsuyama | ................ 358/1.15 |

FOREIGN PATENT DOCUMENTS

| | | | |
|---|---|---|---|
| JP | 6-54176 | 2/1994 | ............. H04N/1/40 |
| JP | 8-320770 | 12/1996 | ............. G06F/3/12 |

* cited by examiner

Primary Examiner—Tuan Ho
Assistant Examiner—Luong T. Nguyen
(74) Attorney, Agent, or Firm—Sughrue Mion, PLLC

(57) ABSTRACT

An image print system including a client system connected to a server through the Internet. The client system makes an access to the server. In response to the access, the server delivers an application program including a reference image containing a picture pattern for detecting a controlled state of a display device in the client system. The client system displays on the display device the reference image taken by an image pickup device photographing an original image to be printed. Receiving the reference image data and the original image data from the image pickup device, the client system transfers them to the server. The server reproduces, in accordance with the reference image data, the original image data exactly as viewed on the display device, and supplies a printer with image data obtained by adding a print processing to the reproduced image data to be printed out. This enables the original image to be reproduced just as displayed on the display device of any user.

25 Claims, 11 Drawing Sheets

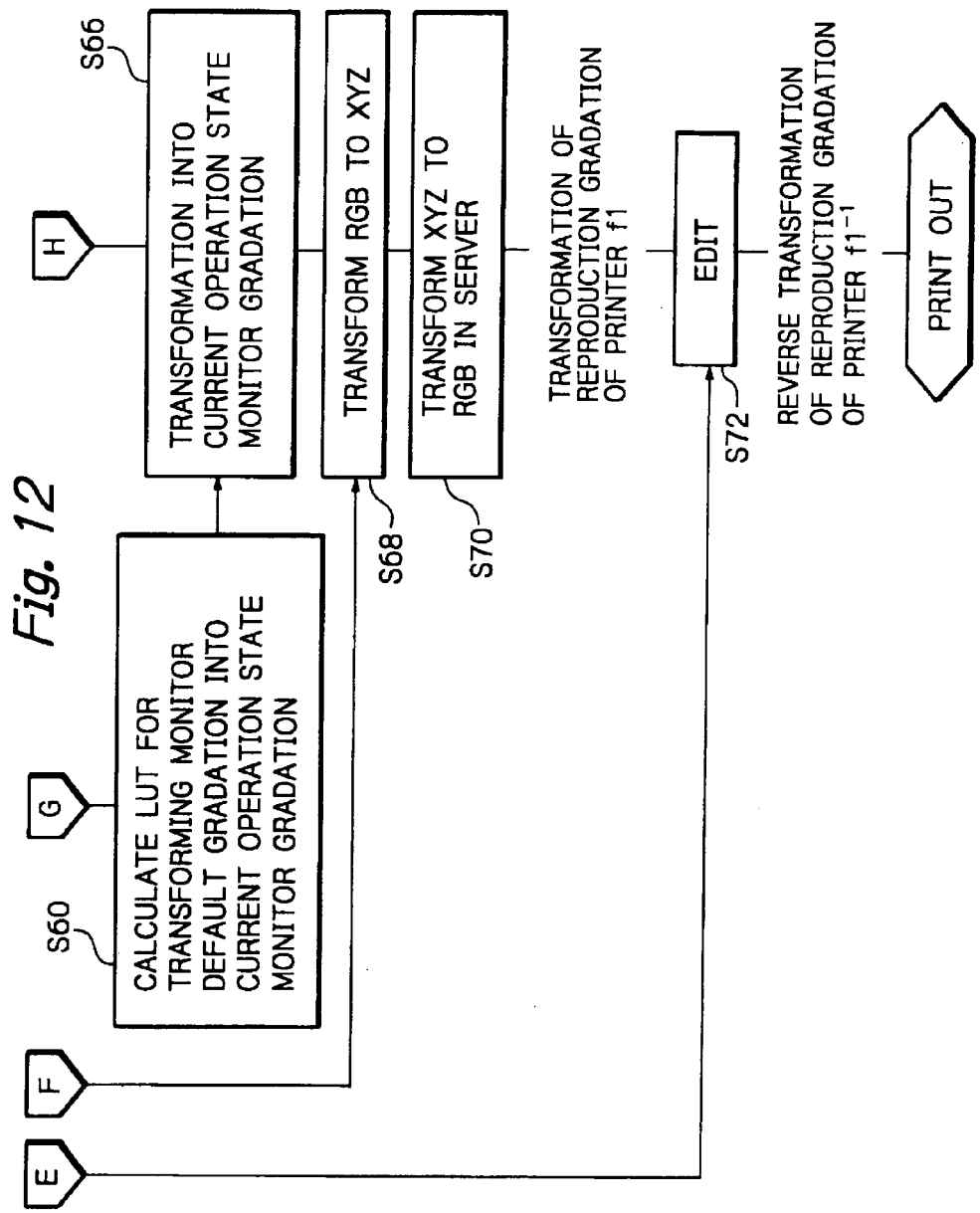

SYSTEM FOR AND METHOD OF PRINTING IMAGE ACCORDING TO CONTROLLED STATE OF USER MONITOR

BACKGROUND OF THE INVENTION

1. Field of the Invention

The present invention relates to an image print system and an image print method, and more particularly to an image print system and an image print method which are preferably applied for printing at a server image data that are transmitted from any multiple users to the server through a telecommunications network such as the Internet.

2. Description of the Background Art

Recently, digital image pickup devices such as electronic still cameras have been spreading which can store and output picked-up images in the form of digital image data. The image data produced from such image pickup devices can be processed and edited by a processor like a personal computer. The image data provided in a processor can be edited to desired images as being viewed on a display device such as a CRT (cathode-ray tube), and the image data representing an edited image are supplied to a printer, e.g. a high resolution printer, to be printed, for example.

Since there are a lot of types of image pickup devices, printers and display devices with various characteristics, the processors must meet various demands of these device types so as to achieve image processings and reproduce images as desired by the users.

Conventional color processing systems or methods for handling such digital images are proposed, for example, in Japanese patent laid-open publication Nos. 54176/1994 and 320770/1996. The '176 publication discloses a technique that computes parameters for mapping image data from an input device like a scanner onto the color space of a computer and parameters for mapping image data fed from the computer onto the color space of an output device like a printer, and supplies the resultant parameters to a device driver, which in turn transforms the image data in its entirety. This enables the image data to be processed with reference to the standard color space independently of an application.

The '770 publication proposes a system comprising image input devices and image output devices such as a printer, which are selectably connected to an image processor through a general purpose interface, wherein image input devices are set with image processing data which match the image output characteristics of the image output devices, and the image processor selects the image processing data which can be used by the image input devices and match the image output device in use. This makes it possible to connect various types of image input devices and image output devices, and to obtain images in a picture quality associated with the characteristics of those devices.

The foregoing conventional techniques, however, have a problem in that they cannot implement accurate color or gradation reproduction unless the input and output devices are placed in a default state, that is, in a standard condition. For example, the '176 publication assumes, when printing a color image processed by the computer, that its monitor and printer are calibrated in advance in a predetermined method so that the printed result will agree with the image as viewed on the monitor. Thus, the monitor must process the image data, and supplies the printer with the processed data with its controlled state maintained.

More specifically, in a system that includes a lot of client systems and a server, which are interconnected through a telecommunications network like the Internet, it depends on the controlled state of the monitor of the client system whether or not an image is edited as the user desires. For example, when the monitor of the user is in its default state, the server can readily reproduce and print an image as the user desired only if the server is supplied with information on the monitor used along with the image data. However, if the user sets the intensity of the monitor at its higher level, and requests the server to print the image in its darker tone, then the actual print becomes darker than the user expected during its editing, resulting in an undesired printed picture.

SUMMARY OF THE INVENTION

It is therefore an object of the present invention to solve the problem of the conventional techniques, thereby providing an image print system and a method capable of reproducing images accurately according to the controlled state of a user's display device, thereby producing printed pictures as the user desires.

According to an aspect of the present invention, there is provided an image print system comprising: a first processor for receiving an original image data representing an original image of an object from an image pickup device picking up the original image, and processing the original image data, the first processor including a display device for displaying an image based on the original image data for the confirmation of the image; and a second processor connected with a printer for receiving the original image data from the first processor, performing a print processing on the original image data, and supplying the printer with image data obtained in the print processing. The first processor includes: a display processor for displaying a reproduced image, which represents an image to be printed, on the display device in accordance with the original image data, and for displaying on the display device a reference image for the detection of a controlled state of a screen of the display device; and a data transmitter for receiving, from the image pickup device, reference image data which are produced by the image pickup device capturing the reference image displayed on the display device, and for transmitting the reference image data and the original image data. The second processor receives the reference image data sent from the first processor, restores, using the reference image data received, a display state of the reproduced image displayed on the display device, generates print image data representing a print image from image data associated with the restored display state, and supplies the printer with the print image data.

The image print system may advantageously comprise a client-server system interconnecting the first processor and the second processor by a communication line. The display processor may display on the display device the reproduced image in a gradation matching to a gradation of the printer connected to the second processor.

The display processor may receive information representing the gradation of the printer from the second processor over the communication line, and may display on the display device the reproduced image in the gradation provided by the information received.

The display processor may be provided with information on the gradation of the printer through a storage medium, and may display on the display device the reproduced image in the gradation obtained from the information provided through the storage medium.

The data transmitter may transmit to the second processor information on device types of the display device and the image pickup device, besides the original image data and the reference image data.

The second processor may comprise a data transformer for sequentially executing a processing which includes a first transformation of transforming the original image data in accordance with characteristics associated with the device type of the image pickup device, a second transformation of transforming the transformed data in the first transformation in accordance with characteristics associated with the device type of the display device, a third transformation of transforming the transformed data in the second transformation in accordance with the display state provided by the reference image data, and a fourth transformation of transforming the transformed data in the third transformation in accordance with characteristics of the printer.

The first processor may further comprise an editor for editing the original image into a desired image, and may transmit to the second data processor information which the editor generates together with the original image data.

According to another aspect of the present invention, there is provided a method of printing an image, comprising the steps of: capturing an original image by an image pickup device; displaying the original image captured by the image pickup device on a display device as a reproduced image; displaying on a screen of the display device a reference image for detection of a controlled state of the display device; capturing the reference image displayed on the screen by the image pickup device to produce reference image data; estimating a displayed state of the reproduced image displayed on the display device from the reference image data; restoring print image data representing a print image associated with the reproduced image on the basis of the estimated, displayed state of the reproduced image to be displayed on a server monitor; performing a printing processing on the print image data; and printing an image represented by the print image data performed with the printing processing.

In the method, the reference image may advantageously comprise a picture pattern representing gradation levels.

The image print method may further comprise the step of calculating a reflectivity of the screen of the display device from information on a device type of the image pickup device and the reference image data.

The image print method may further comprise the step of calculating, from information on a device type of the display device and the reflectivity, transformation coefficients for modifying a gradation of the original image into a gradation of the display device.

The image print method may further comprise a first transformation step of transforming, in accordance with the information on the device type of the image pickup device, the original image data produced by the image pickup device into image data representing luminance values of pixels.

The image print method may further comprise a second transformation step of transforming, in accordance with the information on the device type of the display device, image data transformed in the first transformation step into the reproduced image to be displayed on the display device.

The image print method may further comprise a third transformation step of transforming, in accordance with gradation characteristics of the display device, image data transformed in the second transformation step into the reproduced image to be displayed on the display unit.

The image print method may further comprise a fourth transformation step of transforming, in accordance with the information on the device type of the image pickup device, the image data transformed in the third transformation step into image data representing luminance values of pixels.

The image print method may further comprise a fifth transformation step of transforming image data transformed in the fourth transformation step into image data which match reproduction gradation characteristics of the server monitor.

The image print method may further comprise a sixth transformation step of transforming image data transformed in the fifth transformation step into image data with a gradation matching a gradation of a printer.

The image print method may further comprise the step of editing the original image produced by the image pickup device into a desired image, wherein the print image data are edited using information obtained during the step of editing.

BRIEF DESCRIPTION OF THE DRAWINGS

The objects and features of the present invention will become more apparent from consideration of the following detailed description taken in conjunction with the accompanying drawings in which;

FIGS. 9–12 show a control flow implementing a print method applied to the embodiment.

DESCRIPTION OF THE PREFERRED EMBODIMENTS

Figure 1:
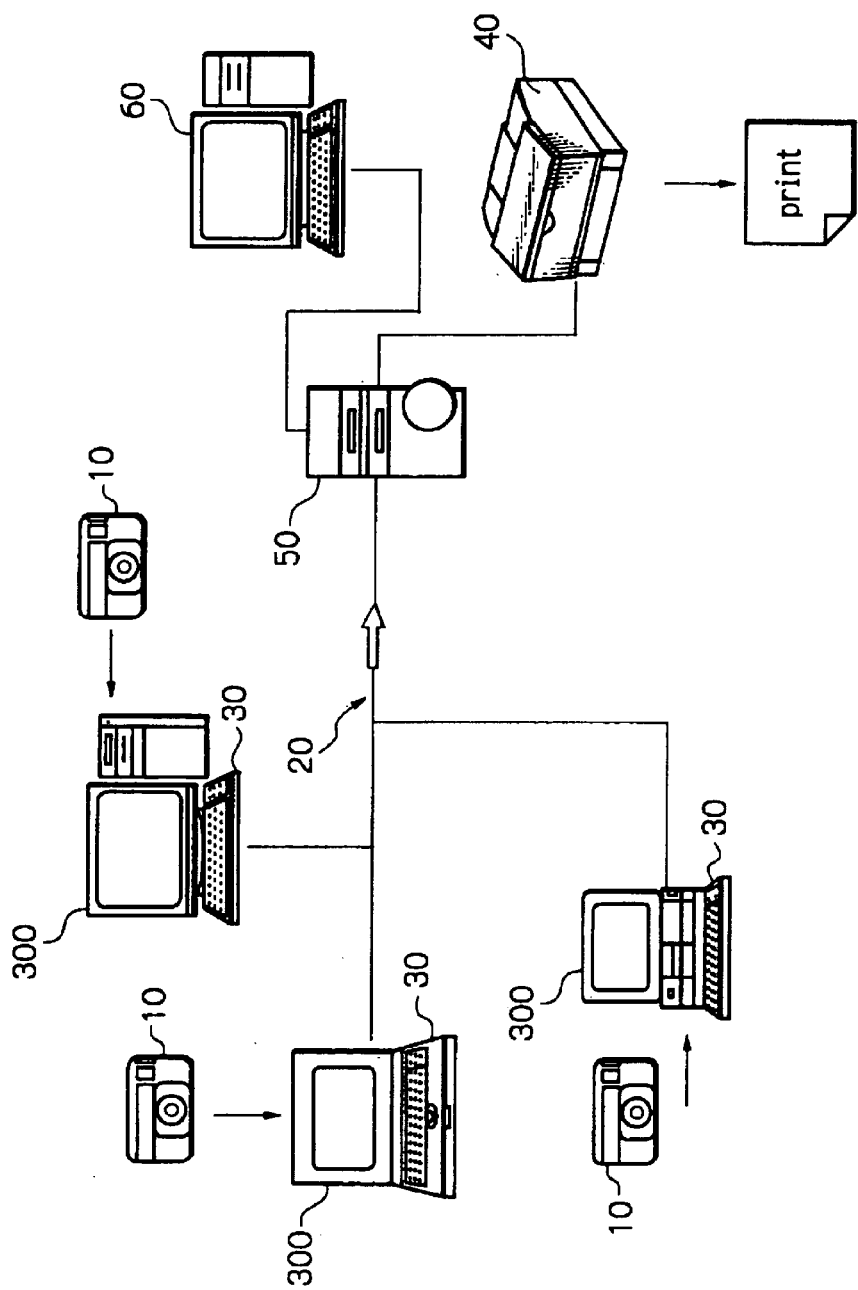
FIG. 1 schematically shows an embodiment of an electronic image print system in accordance with the present invention.

Referring now to FIG. 1 showing an embodiment of an image print system in accordance with the present invention, the image print system functions as an image editor system that is adapted to receive original image data representing an image captured by a digital image pickup device such as an electronic digital still camera (DSC) 10, supply the original image data to a client system 30 connected with a telecommunications network such as the Internet 20, and transmit original image data edited by the client system 30 to a server 50 to which a high resolution printer 40 is connected, thereby printing out a picture represented by the edited original image data. In the instant embodiment, the server 50 may advantageously be installed in a photofinishing laboratory, called a photo lab, and functions as a photograph printer system which is adapted to accept print requests from various customers, and print their picked-up images into printed pictures to hand them to the customers.

More specifically, the client system 30 consists of an information processor system such as a personal computer (PC) including a communication device accessible to the Internet 20, and functions as an image editor that is adapted to display on a display device 300 like a CRT (cathode-ray tube) or a liquid crystal display an image picked up by the electronic digital still camera 10, and edit the picked-up image into a desired form of image. In particular, the client system 30 in the present embodiment edits the image by using image print application program sequences downloaded from the server 50 over the Internet 20, reproduces the edited image on the display device 300, and transmits to the server 50 the edited original image data representative of the edited image. As shown in a block diagram of FIG. 2, the client system 30 of the embodiment generally comprises an image data input subsection 310, a display processor 320, an image editor 330 and a data transmitter 340, for example.

Figure 2:
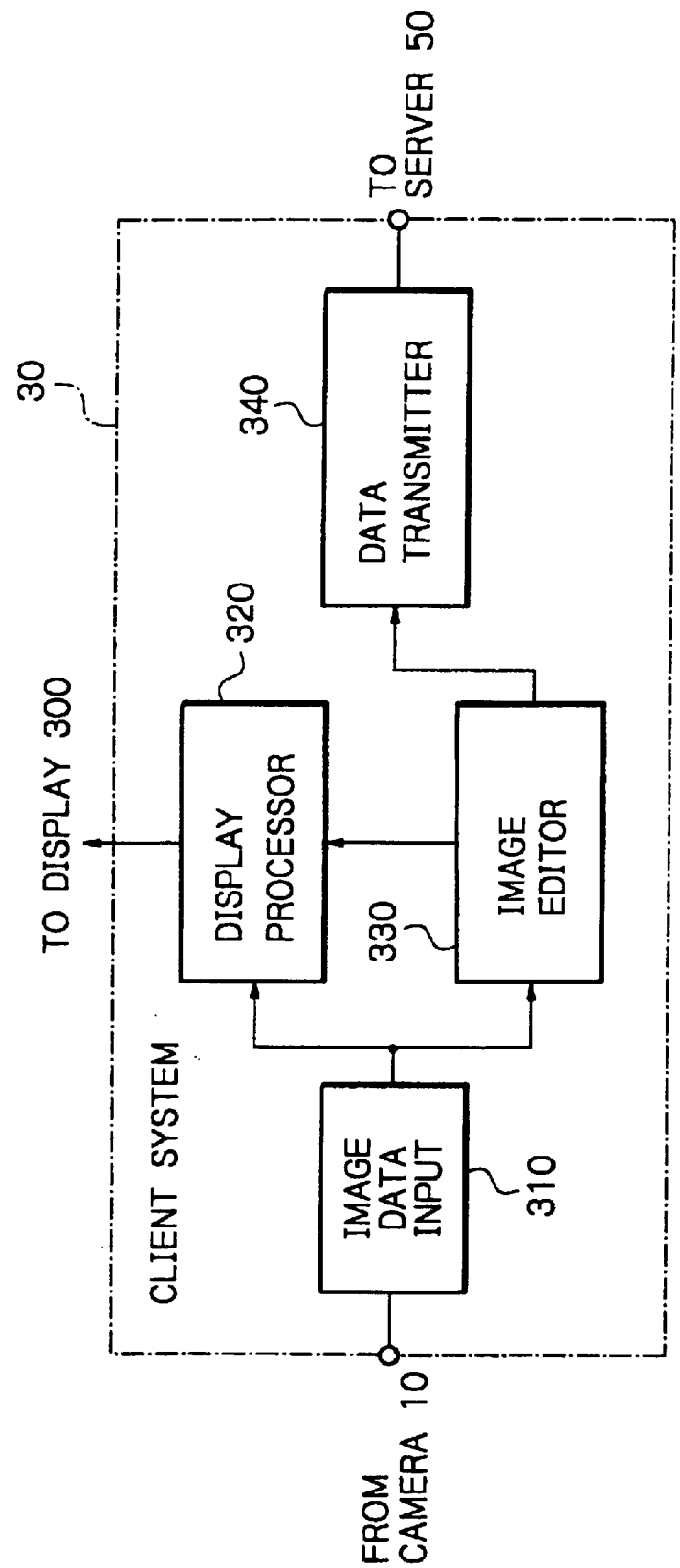
FIG. 2 is a schematic block diagram showing the major portion of a client system of the embodiment shown in FIG. 1.

Referring to FIG. 2, the image data input subsection 310 functions as an input interface that is connected to the digital output of the electronic still camera 10 to receive the original image data of an image of an object captured in advance by the camera 10. The image data input subsection 310 includes an input interface compatible with an input system such as a serial input, e.g. RS-232C, and a storage medium, e.g. a PC card or the like. It is preferable that the client system 30 acquires, besides the original image data, information representing the device type of the electronic still camera 10 in use. The original image data are obtained from the electronic still camera 10, for example, by quantizing on a pixel-by-pixel basis the intensity of imagewise light sensed by an image pickup device such as a CCD (charge-coupled device) and performing on resultant pixel data image processings such as gamma correction and white balance adjustment in accordance with the characteristics of the pixel data thus obtained. The original image data are in the form of digital data consisting of a predetermined number of bits, and represented by primary colors R, G and B (red, green and blue, repsectively), for example.

Figure 4:
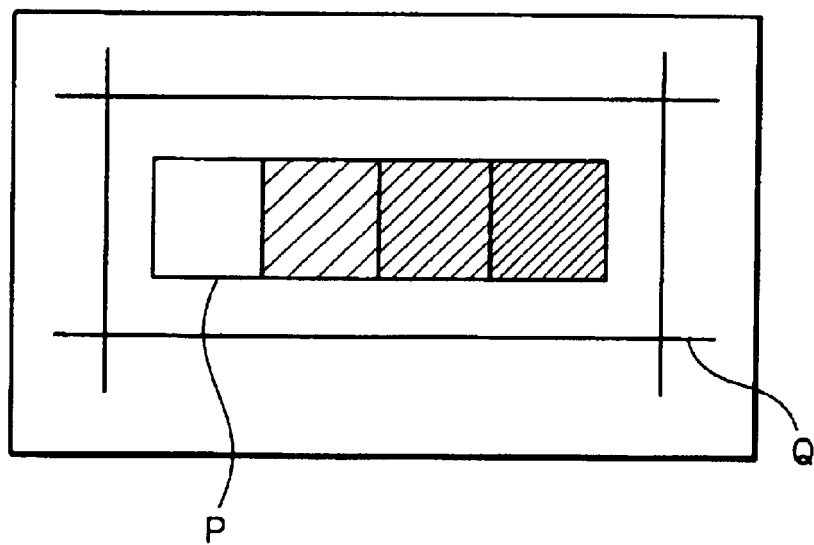
FIG. 4 schematically illustrates an example of a reference image applied to the illustrative embodiment.

The display processor 320 performs processings such as the gamma correction on the original image data supplied from the image data input subsection 310 and on the image data under editing in accordance with the characteristics of the display device 300. In the illustrative embodiment, the display processor 320 receives from the server 50 a reference image of a predetermined pattern, and displays the reference image on the display device 300 to determine the operation state, or the controlled condition, of the display device 300. It is preferable that the reference image is composed of rectangular, picture patterns P representing a gradation in a gray scale as shown in FIG. 4. In the present embodiment, the rectangular patterns P are enclosed by a reference frame Q in the form of lattice for image pickup. The reference image displayed on the display device 300 is also taken by the electronic still camera 10 that is used to photograph the image to be printed, and is brought into the client system 30 in the same manner as the original image data to be printed.

In this connection, the contrast, brightness and the like characteristics of the display device 300 can be freely set up with its control pad, not shown, so that a user can carry out desired adjustments in accordance with luminous or environment and his or her visual acuity. Thus, the controlled state may vary from user to user. In the instant embodiment, the reference image including the gradation patterns P is displayed on the screen of the display deveice 300, and taken by the camera 10 in order to determine the controlled state of the display device 300 from the reference image data thus obtained by taking the gradation patterns P. This makes it possible to determine the operation state of the display device 300 such as its output light intensity or brightness.

Returning to FIG. 2, the image editor 330 is a processor circuit which is adapted to edit an image displayed on the display device 300 into a desired form of image in response to the operation of the user. The editor 330 reproduces a print image by using the application program sequences provided from the server 50, and supplies the data transmitter 340 with resultant image data representing that reproduced image. The application program in the embodiment executes, after downloaded, processings which include selection of the device types of the monitor 300 and electronic still camera 10 in use, display of the reference image by the display processor 320, selection of the luminous conditions during the image pickup of the reference image, reception of the reference image data, and reproduction, display and editing of the image to be printed, etc. The selection of the luminous or lighting conditions includes information on a light source for lighting during photographing, such as daylight, a stroboscope, a fluorescent lamp, to etablish the reference white of the electronic still camera. The display of the reproduced image to be printed includes information on tonal levels which are reproduced by the high resolution printer 40 of that device type connected to the server 50, and in accordance with which the image data supplied from the electronic still camera 10 are visualized after having transformed.

The data transmitter 340 is adapted to transfer the edited original image data processed by the image editor 330 to the server 50 over the Internet 20. The transmitter 340 functions in the present embodiment as a file transfer circuit for sequentially forming into suitable files the original image data fed from the electronic still camera 10 reference image data taken by the electronic still camera 10 for determining the controlled state of the display device, luminous conditions encountered at the time when the reference image is shot, information on the device types of the monitor and electronic still camera, and editing information.

Figure 3:
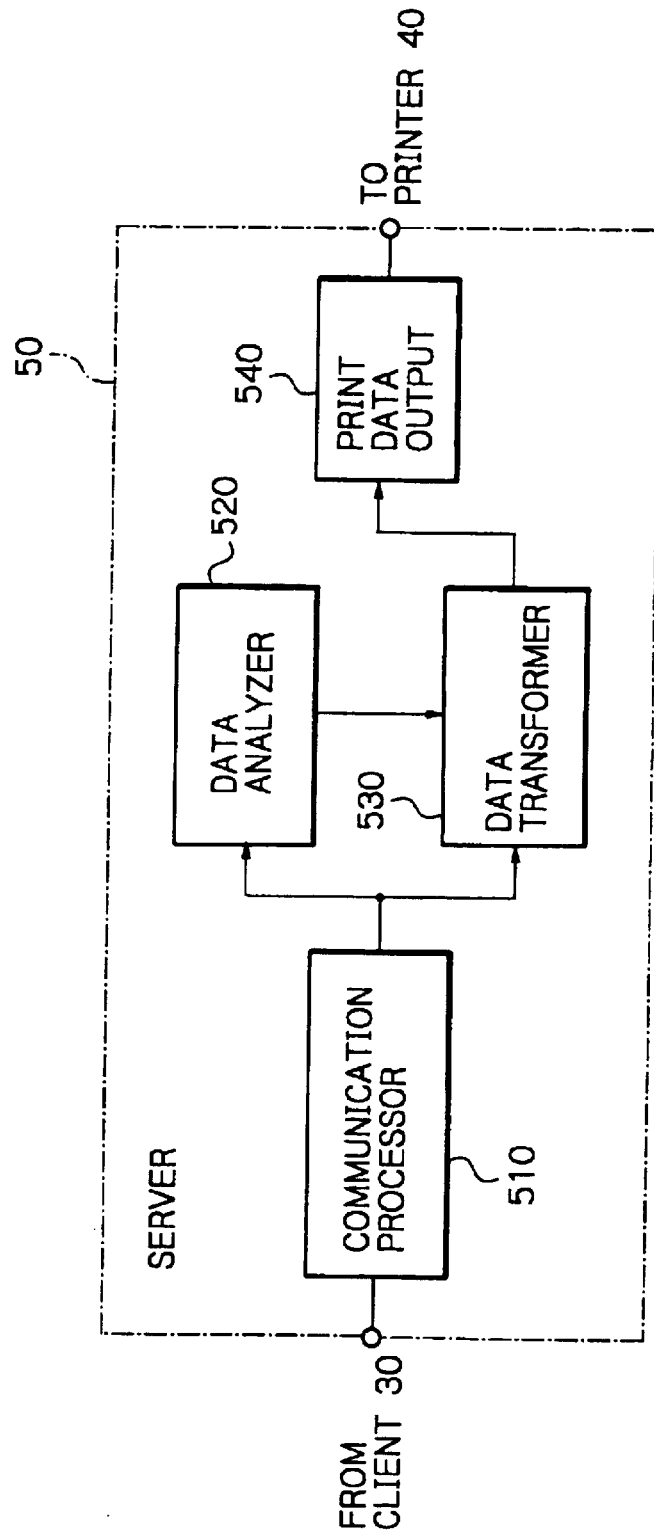
FIG. 3 is a schematic block diagram, like FIG. 2, showing the major portion of a server of the embodiment shown in FIG. 1.

The server 50 in the instant embodiment is a host processor that is adapted to receive accesses from a variety of client systems 30 over the Internet 20, and execute appropriate processings for specific clients in response to their requests. The server 50 functions as a print processor for printing, with the high resolution printer 40 connected to it, pictures based on the edited original image data received from each of the client systems 30 on the Internet 20. In particular, in the present embodiment, the server 50 also serves as a data processor which processes the edited original image data, associated with the user's edited image, in accordance with the reference image data obtained by photographing the reference image displayed on the display device 300 of a specific client system 30, such that the resultant image will be appropriately reproduced in accordance with the displayed state of the original image data on the display device 300, and then supplies the resultant processed data to the high resolution printer 40 for printing. As shown in the functional block diagram of FIG. 3, the server 50 generally comprises a communication processor 510, a data analyzer 520, a data transformer 530 and a print data output subsection 540, for example.

The communication processor 510 includes a communication controller for forwarding and receiving information to and from the client systems 30 over the Internet 20. The processor 510 serves as a transmitter and receiver for transmitting the application program sequences in response to the access from the client systems 30, and receives data of files associated with the print images processed by the client systems 30. The files received are supplied to the data analyzer 520 and data transformer 530.

The data analyzer 520 is adapted to extract from the files, which are received from the respective client systems 30 via the communication processor 510, the reference image data representing the reference image which is displayed on the display device 300 and taken by the electronic still camera 10 of a specific client, and analyzes the display condition on the display device 300. The data analyzer 520 functions in the present embodiment as a coefficient calculator that includes, for respective device types of the electronic still cameras 10 and display devices 300, a device type information table defining the characteristics of those devices. The data analyzer 520 is adapted to estimate the controlled state of the display device 300 of a specific user with reference to the table and reference image data, and calculate the transformation coefficients, in accordance with which the edited original image data are transformed into the data to be printed. It is preferable that the device type information table includes, for a specific device type, data representative of characteristics such as the reference white, chromaticity coefficients of specific colors, and the ICC (International Color Consortium) profile including the gamma characteristics, in the embodiment.

Figure 5:
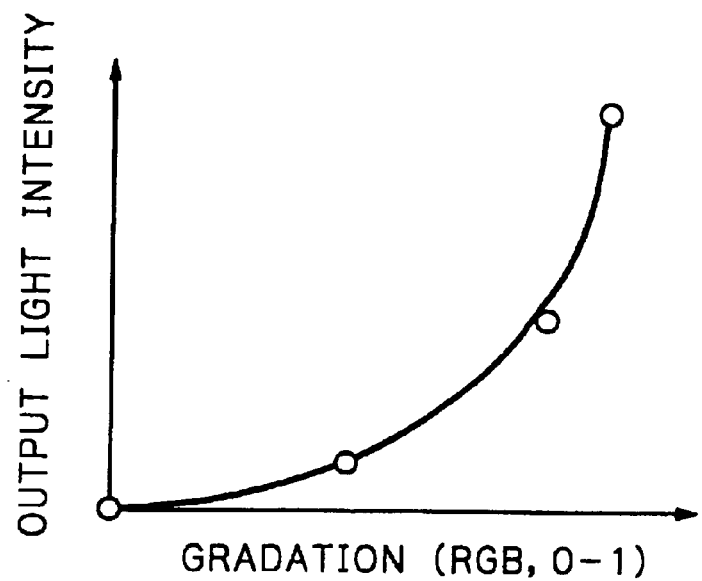
FIG. 5 plots an example of the gamma characteristics of a display device in the embodiment.
Figure 6:
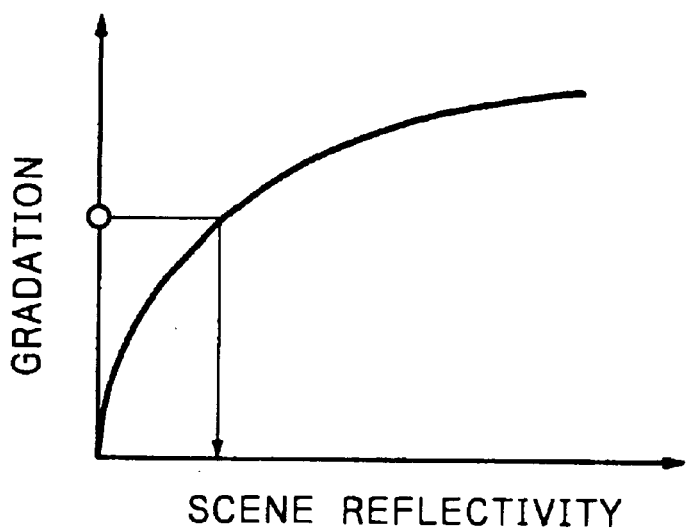
FIG. 6 plots an example of the image pickup characteristics of an electronic still camera in the embodiment.
Figure 7:
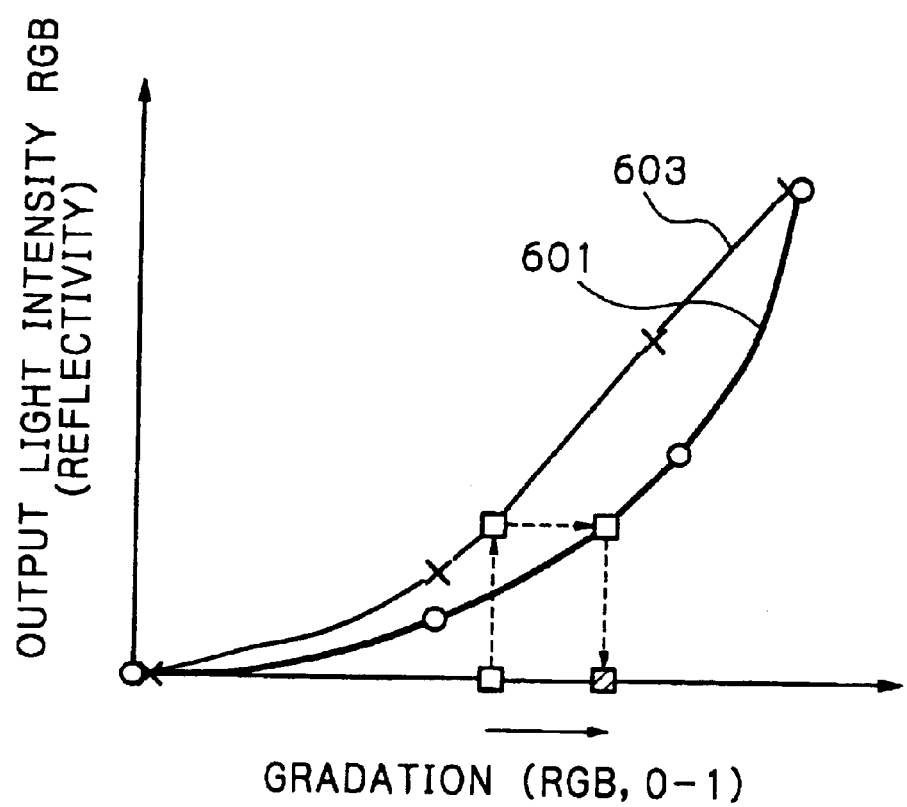
FIG. 7 is a graph, similar to FIG. 5, useful for understanding a gradation modification in the display device of the embodiment.

For example, as shown in FIG. 5, the output light intensity of the display device 300 on the vertical axis is determined by the gamma characteristic of the display device 300 against the normalized values of given R, G and B data, that is, the gradation levels on the horizontal axis. Generally, the relationships between the output light intensity V and a voltage $\underline{v}$ applied to an indicator device such as a CRT of the monitor in response to the gradation level can be represented by the following expression (1).

$$V = Av^\gamma \quad (1)$$

where A is a normalizing constant and $\gamma$ is a gamma coefficient, in which the logarithm of the output light intensity V corresponds to the reflectivity of the display device 300. In the instant embodiment, the reflectivity on the screen of the display device 300 in use is obtained from the luminous environment around the display device 300 and the levels of the gradation patterns P of the reference image which are obtained by shooting the reference image displayed on the display device 300 by the electronic still camera 10 of the user. In FIG. 6, in which the gamma characteristics of the electronic still camera 10 are exemplified, the horizontal axis represents the light input corresponding to the scene reflectivity of the monitor screen, and the vertical axis represents the camera output corresponding to the gradation levels of the reference image data. Thus, as shown in FIG. 6, the output light intensity of the monitor corresponding to the scene reflectivity represented on the horizontal axis can be obtained from the reference image data, that is, the output of the electronic still camera 10 represented on the vertical axis. Afterward, transformation coefficients between the default state 601 and the actual operation state 603 of the display device 300 can be obtained as shown in FIG. 7, and the transformation coefficients are supplied to the data transformer 530 to form a look-up table (LUT).

The data transformer 530 is a printing processor adapted to transform the edited original image data to be printed which are received from the client system 30 into image data with the gradation levels corresponding to the display state of the user display device 300, and carries out processings for printing the transformed data accordingly. In the illustrative embodiment, the transformer 530 transforms the R, G and B image data representing the edited original image data in accordance with the image sensing characteristics of the electronic still camera 10 employed by the user, the default characteristics of the display device 300, and the transformation coefficients supplied from the data analyzer 520, thereby reproducing the object image data to be printed.

Figure 8:
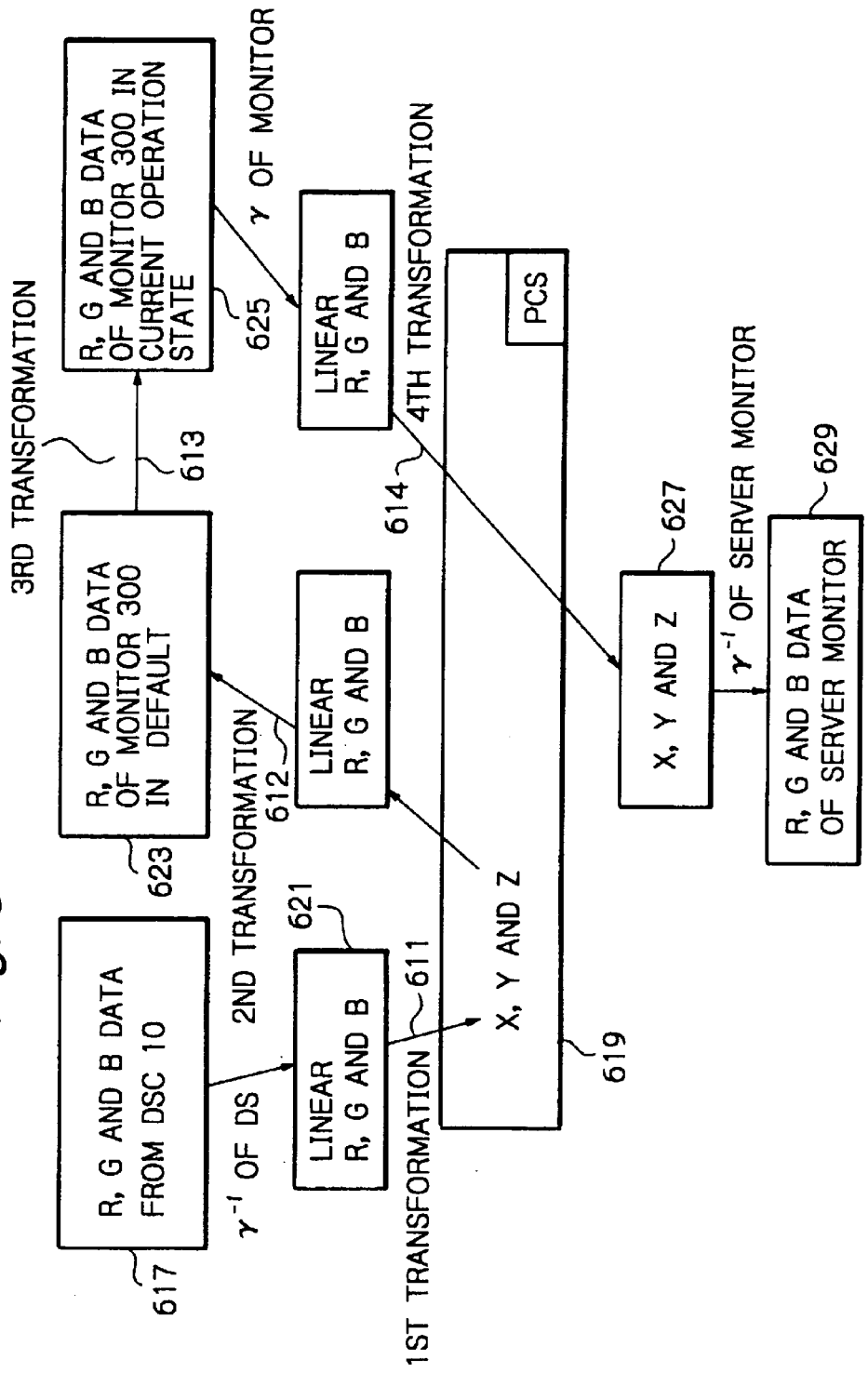
FIG. 8 is a schematic block diagram useful for understanding data transformations in a server of the embodiment.
Figure 9:
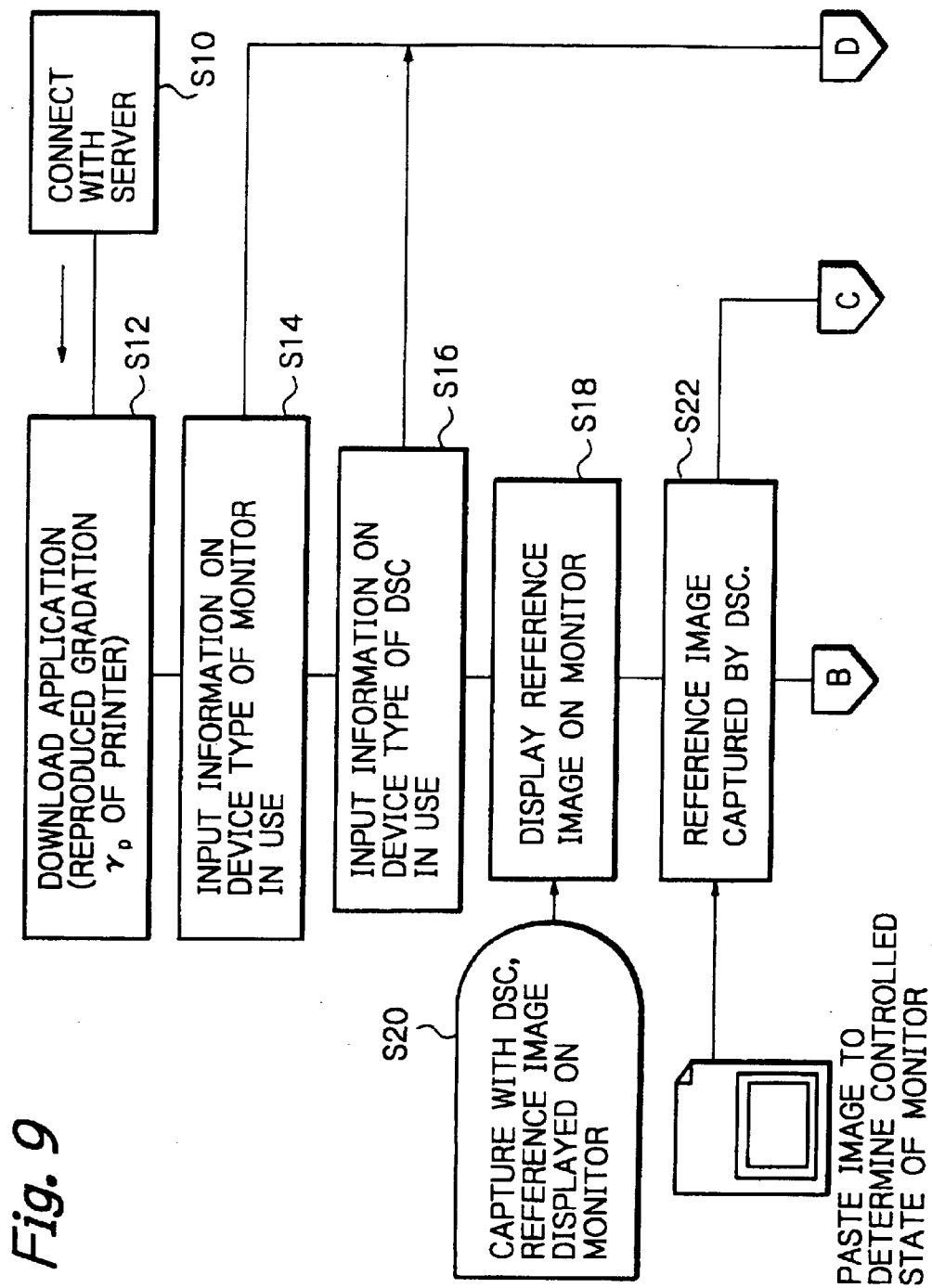

More specifically, the original image data output from the electronic still camera 10 are sequentially subjected to the following, first to fourth transformations 611–614, as schematically shown in FIG. 8:

(1) First Transformation 611:

The R, G and B data (original image data) 617 output from the electronic still camera 10 are transformed into the tristimulus X, Y and Z values 619 through linear R, G and B data 621, using the reference white given by the luminous environment and the gamma characteristics provided by the ICC profile, for example, in the device type information table of the electronic still camera 10.

(2) Second Transformation 612:

The tristimulus X, Y and Z values 619 are transformed into the R, G and B data 623 of the display device 300 in the default state, using the gamma characteristics and reference white provided by the ICC profile of the display device 300, for example.

(3) Third Transformation 613:

The R, G and B data 623 of the display device 300 in the default state are transformed into the R, G and B data 625 of the display device 300 in the current controlled state using the transformation coefficients supplied from the data analyzer 520.

(4) Fourth Transformation 614:

The R, G and B data 625 of the display device 300 in the current controlled state are transformed into the tristimulus X, Y and Z values 627 using the gamma characteristics and reference white provided by the ICC profile of the display device 300, for example, and the tristimulus X, Y and Z values 627 are further transformed into the R, G and B data 629 of a server monitor 60, FIG. 1, corresponding to the characteristics of the printer 40.

Thus, the transformation between the tristimulus X, Y and Z values and the R, G and B data are carried out using the reference white, primary color chromaticity coefficients and gamma characteristics of the input and output devices. If the device types are not selected, or their characteristics are not provided in the device type information table, the transformations can be carried out using the Z transform based on the CIE D65 reference white, the ITU-R BT.709 primary color chromaticity coefficients, and the ITU-R BT.709 gamma characteristics.

In the present embodiment, the R, G and B data obtained at the fourth transformation are further transformed into the tone levels of the printer 40, followed by adding the user editing information, by transforming into the data that can be handled by the printer 40, and by supplying to the printer 40 through the print data output subsection 540.

Here, the transformation of the tristimulus values X, Y and Z to the primary colors R, G and B of the display device 300 can be performed by a matrix transformation given by the following expression (2).

$$(B)\begin{pmatrix} R \\ G \\ B \end{pmatrix} = \begin{pmatrix} X \\ Y \\ Z \end{pmatrix} \qquad (2)$$

where B is a square matrix of order three, and its entries are obtained by the following procedure. First, assume that the tristimulus values X, Y and Z of the primary colors R, G and B are represented as follows.

Tristimulus values of R: XR, YR and ZR
Tristimulus values of G: XG, YG and ZG
Tristimulus values of B: XB, YB and ZB When these primary colors become maximum, their tristimulus data $(x_w, y_w, z_w)$ are each represented at mixed ratios given by the following expressions (3), (4) and (5).

$$a_r x_r + a_g x_g + a_b x_b = x_w \qquad (3)$$

$$a_r y_r + a_g y_g + a_b y_b = y_w \qquad (4)$$

$$a_r z_r + a_g z_g + a_b z_b = z_w \qquad (5)$$

Normalizing those expressions by $y_w$ gives the following expressions (6), (7) and (8).

$$a_r/y_w x_r + a_g/y_w x_g + a_b/y_w x_b = x_w/y_w \qquad (6)$$

$$a_r/y_w y_r + a_g/y_w y_g + a_b/y_w y_b = 1 \qquad (7)$$

$$a_r/y_w z_r + a_g/y_w z_g + a_b/y_w z_b = z_w/y_w \qquad (8)$$

Replacing the normalized coefficients $(a_r/y_w, a_g/y_w, a_b/y_w)$ with $(a_r', a_g', a_b')$, the following expression (9) is obtained.

$$\begin{pmatrix} x_r & x_g & x_b \\ y_r & y_g & y_b \\ z_r & z_g & z_b \end{pmatrix} \begin{pmatrix} a_r' \\ a_g' \\ a_b' \end{pmatrix} = \begin{pmatrix} x_w/y_w \\ 1 \\ z_w/y_w \end{pmatrix} \qquad (9)$$

Thus, the re lation ships between the R, G and B and X, Y and Z of a given pixel are given by the following expression (10).

$$\begin{pmatrix} a_r' x_r & a_g' x_g & a_b' x_b \\ a_r' y_r & a_g' y_g & a_b' y_b \\ a_r' z_r & a_g' z_g & a_b' z_b \end{pmatrix} \begin{pmatrix} R \\ G \\ B \end{pmatrix} = \begin{pmatrix} X \\ Y \\ Z \end{pmatrix} \qquad (10)$$

The values R, G and B obtained here are each normalized to the white value at the maximum luminance. These values undergo the gamma correction of the display device, and the multiplication by a value corresponding to the number of bits, such as 255 in the case of eight bits, thereby obtaining the object R, G and B data.

Returning to FIG. 1, the high resolution printer 40 is adapted for printing a picture based on the image data processed by the server 50. For example, a thermal transfer type or thermal sublimative type full-color printer may be preferably applied.

In operation, with reference to the flowcharts of FIGS. 9–12, the user first operates the client system 30, and makes an access to the Internet 20 by using its telecommunications function. Thus, the client system 30 is connected to the server 50 through the Internet 20 at step S10, and downloads from the server 50 the application program sequences for the image printing, which include the gradation information for the reproduction involved in printing, at step S12.

Subsequently, at step S14, the client system 30 inputs the information on the device type of the display device 300 in use in accordance with the instructions of the application program. The system 30 also inputs at step S16 the information on the device type of the electronic still camera (ESC) 10 for providing the original image to be printed. It is preferable with the instant embodiment that the client system 30 is adapted to obtain the device type information on the electronic still camera 10 at the time when the electronic still camera 10 is connected to the client system 30. The device type information input at steps S14 and S16 is stored afterward by the data transmitter 340 together with other information into a file for the transformation information.

At the next step S18, the display processor 320 has the display device 300 display the reference image including the pictorial patterns P shown in FIG. 4, in response to the instructions of the application program provided through the image editor 330. Then, the user photographs with the electronic still camera 10 the reference image displayed on the display device 300 at step S20, and inputs the reference image data and the information representing the lighting conditions at that time from the camera 10 into the client system 30, at step S22. The reference image data are once stored in a RAM or hard disk of the client system 30 through the image data input subsection 310, and afterward supplied to the data transmitter 340 together with the edited original image data to be printed, so that they are formed into a file.

At the following step S24, the client system 30 receives the original image data from the electronic still camera 10, transforms it, in response to the instructions of the application program, into the image data with the gradation of printing, and displays the transformed image on the display device 300 at step S26. In the course of this, the original image data of the captured original image are supplied to the data transmitter 340 to be formed into the file.

Watching the image displayed on the display device 300, the user edits at step S28 the displayed image by manipulating the client system 30 to carry out processings such as color correction on the displayed image. In thurn, the image editor 330 sequentially generates in response to the instructions of the application program the editing information about the image edited in accordance with the manipulations of the user, and supplies the information to the data transmitter 340.

Completing the image editing at step S30, the user commands the file transfer at step S32. In response, at step S34, the data transmitter 340 sequentially transfers to the server 50 over the Internet 20 the files containing the edited original image data generated from the original image data, the reference image data and luminous information, the information on the device types of the display device 300 and electronic still camera 10, and editing information.

Figure 10:
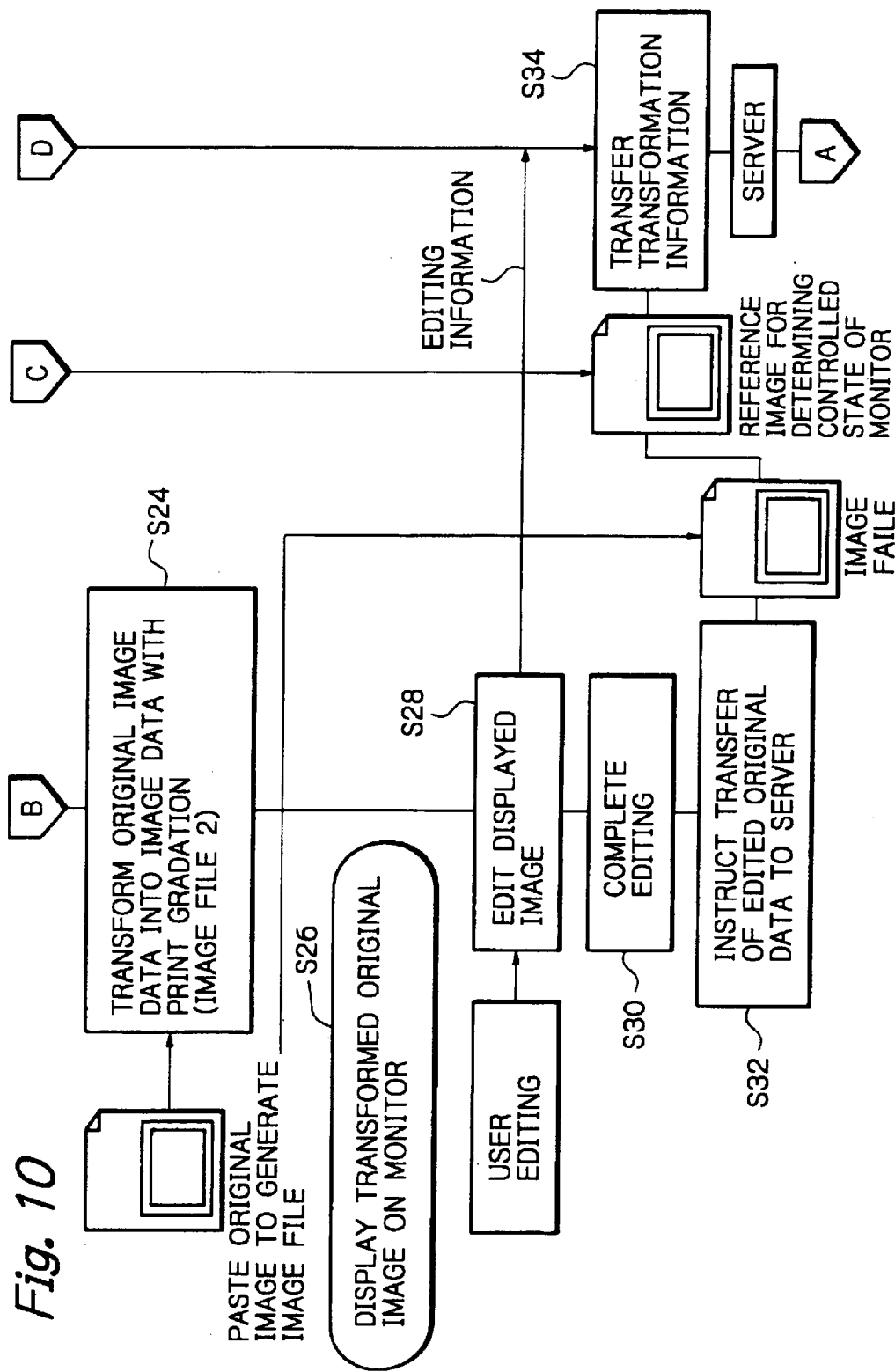
Figure 11:
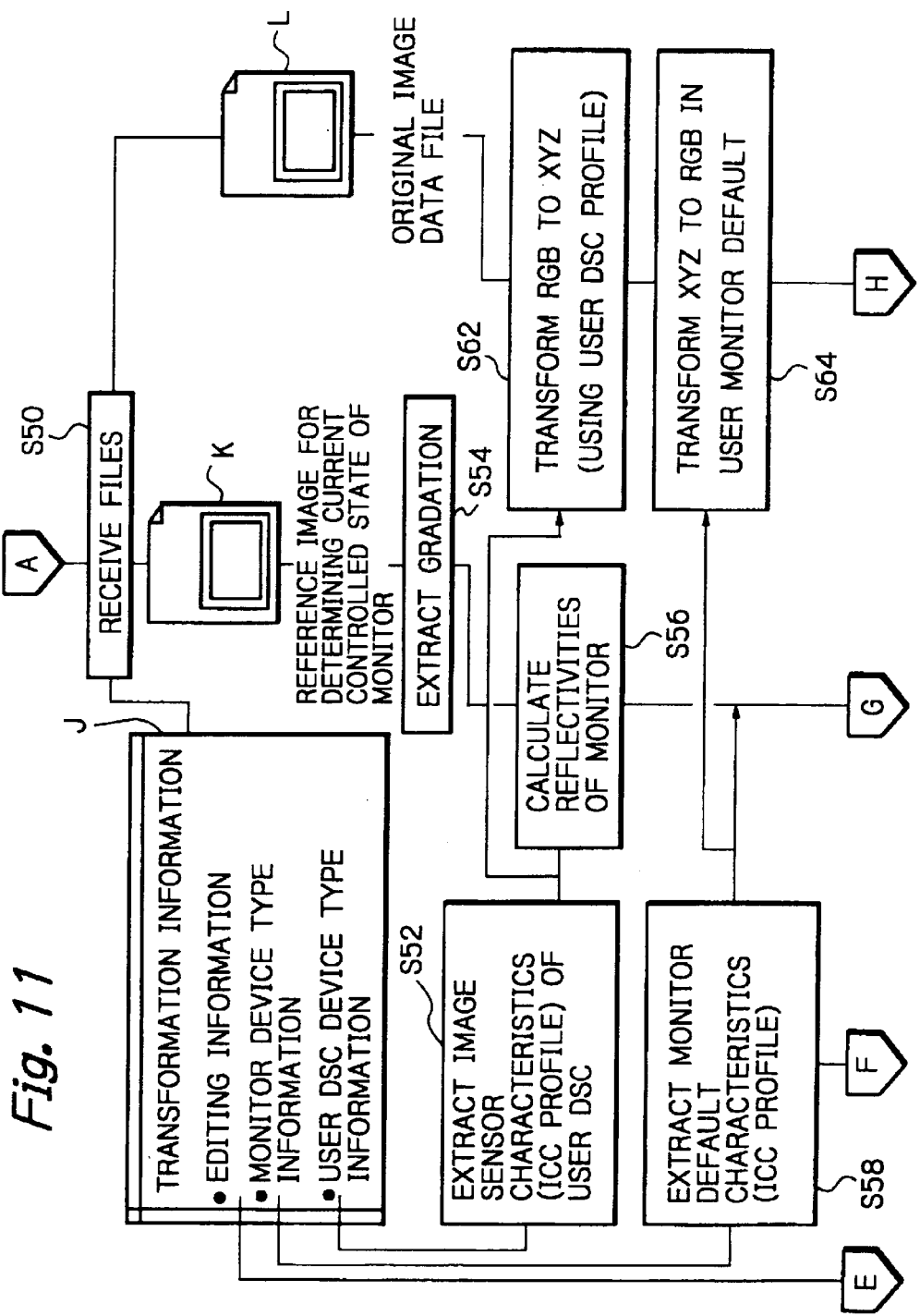

Subsequently, proceeding to step S50, FIG. 10, the server 50 extracts, from the files that are transferred from the client system 30 and received by the communication processor 510, the transformation information J including the device type information and editing information, the reference image data K obtained by photographing the reference image, and the edited original image data L associated with the original image, and supplies them to the data analyzer 520 and data transformer 530.

In response to this, the data analyzer 520 extracts from the transformation information J the device type information on the electronic still camera 10 at step S52, and prepares in accordance with the information a device type information table such as the ICC profile including the imaging characteristics (gamma characteristics) of the electronic still camera 10 employed by the user. Then, at step S54, the data analyzer 520 extracts from the reference image data K the gradation values of the gray portions in the gray scale patterns P shown in FIG. 4. Retrieving the gradation values, the data analyzer 520 sequentially calculates at step 556, from those values and the image sensor characteristics given by the ICC profile, the reflectivities on the monitor screen of the display device 300 in the very state in which the user is operating it, by the curve exemplarily shown in FIG. 6.

At the successive step S58, the data analyzer 520 extracts from the transformation information J the device type information on the user display device 300, and prepares in accordance with the information the ICC profile that will provide the gradation characteristics (gamma characteristics) of the display device 300 in the default state. Thus, the data analyzer 520 sequentially obtains at step S60 the transformation coefficients for transforming the image data to be printed, by comparing the gradation characteristics of the display device 300 in the default with those of the display device 300 in the actual operating state, which are obtained from the reflectivities calculated at step S56. The transformation coefficients obtained are supplied to the data transformer 530 to be established in the form of lookup table.

Receiving the image data of the edited original image from the communication processor 510, the data transformer 530 once transforms at step S62 the R, G and B data corresponding to the primary colors of the original image into the tristimulus values X, Y and Z using the ICC profile of the electronic still camera 10, in the embodiment, prepared in the data analyzer 520. Subsequently, the data transformer 530 transforms at step S64 the tristimulus values X, Y and Z to the R, G and B data to be displayed on the display device 300 using its gamma characteristics in the default state which are given by the ICC profile.

At the next step S66, the data transformer 530, referencing the lockup table supplied from the data analyzer 520, and using the transformation coefficients, sequentially transforms the R, G and B data of the display device 300 in the default state, into the R, G and B data of the display device 300 in the very state in which the user was operating it. The server 50 in turn transforms the edited original image data corresponding to the original image captured by the electronic still camera 10 into the image data that exactly correspond to the image data displayed on the display device 300 in the user's operating state.

At the next step S68, the data transformer 530 transforms the R, G and B data supplied from the step S66 into the X, Y and Z values in accordance with the ICC profile of the display device 300. Subsequently, the data transformer 530 further transforms at step S70 the X, Y and Z values into the R, G and B data of the server monitor 60 with transformation characteristics reversal to those of the high resolution printer 40. Then, the R, G and B data which undergo the processing in accordance with the gradation levels of the print reproduction, are edited in accordance with the edit information.

The resultant image data are further subjected to the transformation reversal to the print reproduction gradation levels, and are printed by the high resolution printer 40.

According to the illustrative embodiment of the image print system, the original image captured by the electronic still camera 10 in any of the client systems 30 is displayed on the display device 300 which is adjusted by the user's preference, undergoes editing such as color correction on the screen of the display device 300, and is sent on the Internet 20 to the server 50 installed in the photofinishing laboratory or the like. In this connection, the reference image, which is displayed on the screen of the display device 300 in the specific patterns, is also taken by the electronic still camera 10 that is used to capture the original image to be printed, and the data representative of picked-up image data are transferred to the server together with the edited original image data. Thus, the server 50 can accurately recognize the controlled state of the display device 300.

In addition, the information on the device types of the electronic still camera 10 and display device 300 in use is sent to the server 50 which has the device type information table representing the characteristics of the employed equipment, such as the ICC profile. The server 50 can therefore obtain the transformation coefficients by comparing the gradation characteristics of the display device 300 in its default state with those of the display device 300 in its current operative state using the reference image data and the device type information, so that the server 50 can reproduce the original image from the edited original image data sent from the client system 30 in the exact state in which the original image is displayed on the display device 300 of the user. As a result, the server 50 can effectively reproduce the original image data which are individually edited on the display device whose controlled state differs from user to user, in a manner just as the user watches on the display device.

Although the application program sequences including the reference image data for printing picture are distributed from the server 50 to each client system 30 over the Internet 20, they may also be distributed to the client's processors through other storage or recording media such as a CD-ROM.

Besides, although the reference image to be displayed on the display device 300 consists of the gray scale patterns P ranging from black to white, the present invention can employ other patterns which allow the display device to definitely present how it displays its gray scale. For example, any patterns such as electronic color samples that the server recognizes in advance can also be applied.

As described above, the image print system in accordance with the present invention displays the image, which is acquired by the digital image pickup device, on a display device in a processor (client system); displays, when printing the image, which is confirmed on the display device, by the printer in another processor (server), the reference image with a specific picture pattern on the screen of the display device in the client system; picks up the reference image displayed on the screen of the display device with the image pickup device that captures the image to be printed; and transmits to the server the reference image data together with the image data of the image to be printed. This makes it possible for the server to accurately recognize the controlled state of the display device in accordance with the reference image data, to accurately reproduce the image data to be printed, which is displayed on the screen of the display device, and to effectively print the desired image based on the image data. As a result, the sever can accurately reproduce and print the image, which is sent from any of the multiple user's systems connected to the Internet, for example, just as that image is displayed on the display device, independently of the controlled state of the specific display device.

The entire disclosure of Japanese patent application No. 233415/1997 filed on Aug. 29, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An image print system comprising:
   a first processor for receiving original image data representing an original image of an object and generated by an image pickup device picking up the original image, and for processing the original image data;
   said first processor comprising a display device for displaying an image based on the original image data for confirmation of the image; and
   a second processor connected with a printer for receiving the original image data from said first processor, performing a print processing on the original image data, and supplying said printer with image data obtained in the print processing;
   said first processor comprising:
   a display processor for displaying a reproduced image, which represents an image to be printed, on said display device in accordance with the original image data, and for displaying on said display device a reference image for detection of a controlled state of a screen of said display device; and
   a data transmitter for receiving, from said image pickup device, reference image data generated from said image pickup device capturing the reference image displayed on said display device, and for transmitting the reference image data together with the original image data,
   said second processor restoring, using the reference image data sent from said first processor, a display state of the reproduced image displayed on said display device, generating print image data representing a print image from image data associated with the restored display state, and supplying said printer with the print image data.

2. The image print system in accordance with claim 1, further comprising a client-server system interconnecting said first processor to said second processor by a communication line.

3. The image print system in accordance with claim 2, wherein said display processor displays on said display device the reproduced image in a first gradation matching to a second gradation of said printer connected to said second processor.

4. The image print system in accordance with claim 3, wherein said display processor receives information representing the second gradation from said second processor over said communication line, and displays on said display device the reproduced image in the first gradation provided by said information received.

5. The image print system in accordance with claim 3, wherein said display processor is provided with information on the second gradation of said printer through a storage medium, and displays on said display device the reproduced image in the first gradation obtained from the information provided through the storage medium.

6. The image print system in accordance with claim 1, wherein said data transmitter transmits to said second processor information on device types of said display device and said image pickup device, besides the original image data and the reference image data.

7. The image print system in accordance with claim 6, wherein said second processor comprises:
   a data transformer for executing a first transformation of transforming the original image data in accordance with characteristics associated with the device type of said image pickup device;
   a second transformer for transforming the data transformed by said first transformer in accordance with characteristics associated with the device type of said display device;
   a third transformer for transforming the data transformed by said second transformer in accordance with the display state provided by the reference image data; and
   a fourth transformer for transforming the data transformed by said third transformer in accordance with characteristics of said printer.

8. The image print system in accordance with claim 1, wherein said first processor further comprises an editor for editing the original image into a desired image, said data transmitter transmitting information generated by said editor to said second data processor together with the original image data.

9. A method of printing an image, comprising the steps of:
   capturing an original image by an image pick up device;
   displaying the original image captured by the image pickup device on a display device as a reproduced image;
   displaying on a screen of the display device a reference image for detection of a controlled state of the display device;
   capturing the reference image displayed on the screen by the image pickup device to produce reference image data;
   estimating a displayed state of the reproduced image displayed on the display device from the reference image data;
   restoring print image data representing a print image associated with the reproduced image on the basis of the estimated, displayed state of the reproduced image to be displayed on a server monitor;
   performing a printing processing on the print image data; and
   printing an image represented by the print image data performed with the printing processing.

10. The method in accordance with claim 9, wherein the reference image comprises a picture pattern representing gradation levels.

11. A method of printing an image, comprising the steps of:
    capturing an original image by an image pick up device;
    displaying the original image captured by the image pickup device on a display device as a reproduced image;
    displaying on a screen of the display device a reference image for detection of a controlled state of the display device;
    capturing the reference image displayed on the screen by the image pickup device to produce reference image data;
    estimating a displayed state of the reproduced image displayed on the display device from the reference image data;
    restoring print image data representing a print image associated with the reproduced image on the basis of the estimated, displayed state of the reproduced image to be displayed on a server monitor;
    performing a printing processing on the print image data; and printing an image represented by the print image data performed with the printing processing, further comprising the step of calculating a reflectivity of the screen of the display device from information on a device type of the image pickup device and the reference image data.

12. The method in accordance with claim 11, further comprising the step of calculating, from information on a device type of the display device and the reflectivity, transformation coefficients for modifying a gradation of the original image into a gradation of the display device.

13. The method in accordance with claim 12, further comprising a first transformation step of transforming, in accordance with the information on the device type of the image pickup device, the original image data captured by the image pickup device into image data representing luminance values of pixels.

14. The method in accordance with claim 13, further comprising a second transformation step of transforming, in accordance with the information on the device type of the display device, image data transformed in the first transformation step into the reproduced image to be displayed on the display device.

15. The method in accordance with claim 14, further comprising a third transformation step of transforming, in accordance with gradation characteristics of the display device, image data transformed in the second transformation step into the reproduced image to be displayed on the display device.

16. The method in accordance with claim 15, further comprising a fourth transformation step of transforming, in accordance with the information on the device type of the image pickup device, the image data transformed in the third transformation step into image data representing luminance values of pixels.

17. The method in accordance with claim 16, further comprising a fifth transformation step of transforming image data that is transformed in said fourth transformation step into image data that matches reproduction gradation characteristics of the server monitor.

18. The method in accordance with claim 17, further comprising a sixth transformation step of transforming image data that is transformed in said fifth transformation step into image data with a gradation matching a gradation of a printer.

19. The method in accordance with claim 9, further comprising the step of editing the original image captured by the image pickup device into a desired image, said step of performing the printing processing comprising the step of using information obtained during the step of editing to modify the print image data.

20. An image print system comprising:

an image pick up device; and a first processor for receiving original image data representing an original image of an object generated by the image pickup device and for processing the original image data;

said first processor attached to a display device for displaying an image based on the original image data;

said first processor comprising:

a display processor for displaying a reproduced image and for displaying a reference image for detection of a controlled state of a screen of said display device; and a data transmitter for receiving, from said image pickup device, reference image data generated from said image pickup device capturing the reference image displayed on said display device, and for transmitting the reference image data together with the original image data.

21. The image print system of claim 20, further comprising a second processor attached to a printer, wherein the data transmitter transmits the reference image data together with the original image data to said second processor.

22. The method of claim 9, further comprising: transmitting the reference image data over a network.

23. The method of claim 22, wherein the reference image data and the reproduced image data are transmitted over the network.

24. The method of claim 9, wherein the capturing of the reference image with the image pick up device comprises capturing the reference image as the reference image is displayed on the screen.

25. The method of claim 9, wherein the reference image data comprises image data obtained from an on screen display of the reference image and is further used to determine the print image data.

* * * * *